United States Patent [19]

Schaus et al.

[11] 4,275,705

[45] Jun. 30, 1981

[54] TWO-STAGE HEAT EXCHANGER

[75] Inventors: Orland O. Schaus, Agincourt; John C. K. Overall, Toronto, both of Canada

[73] Assignee: Canadian Gas Research Institute, Don Mills, Canada

[21] Appl. No.: 115,645

[22] Filed: Jan. 28, 1980

[30] Foreign Application Priority Data

Mar. 15, 1979 [CA] Canada .................................. 323485

[51] Int. Cl.³ .......................... F24H 3/02; F16F 1/34; F24B 7/00
[52] U.S. Cl. ............................. 126/110 R; 126/99 A; 126/108; 126/116 R; 126/117; 165/71; 165/128; 165/DIG. 2; 237/55
[58] Field of Search ............. 165/128, 70, 71, DIG. 2; 126/110 R, 116 R, 108, 117, 109, 99 A, 99 D, 99 C, 110 AA, 106, 102; 237/55

[56] References Cited

U.S. PATENT DOCUMENTS

| | | | |
|---|---|---|---|
| 600,909 | 3/1898 | Elmendorf | 126/99 A |
| 2,102,592 | 12/1937 | Hayne | 126/108 |
| 2,228,602 | 1/1941 | Kolb | 126/108 |
| 2,296,545 | 9/1942 | Tichbourne | 126/108 |
| 2,355,495 | 8/1944 | Zier | 237/55 |
| 2,466,868 | 4/1949 | Scott | 126/117 |
| 2,508,131 | 5/1950 | Zink | 126/108 |
| 4,003,407 | 1/1977 | Finger | 165/71 |
| 4,020,823 | 5/1977 | Baumbach | 165/128 |
| 4,079,885 | 3/1978 | Decker | 237/55 |
| 4,171,089 | 10/1979 | Schossow | 126/117 |

*Primary Examiner*—Daniel J. O'Connor
*Attorney, Agent, or Firm*—Arne I. Fors; Robert F. Delbridge

[57] ABSTRACT

Improved furnaces are described in which secondary and tertiary heat exchanges are incorporated into new and existing hot-air furnace systems for controlled cooling of hot combustion products by co-current and countercurrent heat exchanges. Hot combustion products are cooled to a temperature at which latent heat of water vapor contained in combustion gases are substantially recovered.

In one embodiment of our invention, a secondary heat exchanger comprises inter alia a closed hollow annular drum concentric with and spaced from a cylindrical combustion chamber, said annular drum having an upper annulus preferably filled with randomly packed refractory material.

A second embodiment of our invention comprises a closed double-annuli drum heat exchanger concentric with and spaced from a cylindrical combustion chamber.

Finned tube or thermosiphon heat exchangers can be arranged sequentially with the primary heat exchanger combustion chamber to function as a secondary heat exchanger or as a tertiary heat exchanger.

31 Claims, 9 Drawing Figures

TWO-STAGE HEAT EXCHANGER

BACKGROUND OF THE INVENTION

The present invention relates to heating systems and is particularly directed to improvements in domestic-type, gas- or oil-fired, hot-air heating systems.

Hot-air heating systems, broadly described, comprise a furnace having a combustion chamber for the burning of hydrocarbon fuels to produce heat which is transferred, in part, by means of a heat exchanger to air in a heating chamber. The heated air leaving the heating chamber of the furnace, usually driven by a fan or the like, is passed through suitable duct means to individual rooms of a house or like dwelling to be heated and cool air from the said rooms is reintroduced to the furnace for recycle of the dwelling air as a heating medium.

The seasonal efficiency of known domestic-type furnaces is generally very low, being in the range of about 50–65%, i.e. over the course of a year only 50 to 65% of the heating value of the fuel consumed by the furnace is utilized in heating the dwelling.

Recently attempts have been made to improve the seasonal efficiency of hot air gas furnaces with flue dampers, heat reclaimers, electronic ignition and other energy saving devices. These modifications have only improved the seasonal efficiency to a limited extent.

Two-stage air heating furnaces as shown in U.S. Pat. No. 2,738,785 issued Mar. 20, 1956 are known but have not become commercially successful due to apparent lack of improvement of efficiency, particularly in the second stage.

Domestic-type furnaces must be adapted to meet several stringent requirements. For one, they must meet the approval standards such as CGA standards for forced-air furnaces. As well, new furnace models must be capable of being produced economically and to incorporate design features and materials of construction which are familiar to the trade for ease of production and/or maintenance.

It is accordingly an object of the present invention to provide a furnace adapted for use as a domestic furnace which has a significantly higher steady state and seasonal efficiency than conventional furnaces either operating alone or in conjunction with heat-saving attachments.

The improved furnace systems in accordance with the present invention are capable of attaining significantly higher fuel savings, compared to conventional furnaces with or without fuel saving devices, without sacrificing safety of these furnace systems.

As has been indicated, conventional gas-fired furnaces have an overall cyclic efficiency in the order of about 50 to 65%. In accordance with the furnace systems in the present invention, this efficiency can be appreciably increased so that, on a seasonal basis, the efficiency rating is in the order of 90% or better.

SUMMARY OF THE INVENTION

In accordance with the present invention, there are provided novel furnace systems wherein heating of dwelling air is enhanced and wherein controlled condensation of the products of combustion is permitted to occur so that a significant part of the latent heat of condensation of said products of combustion can be utilized to aid in heating of said dwelling air passing through the furnace. The location of the condensation is controlled such that corrosion attack by the condensate is minimal.

In certain embodiments of our invention, combustion air and fuel are fed into a combustion chamber for ignition in which part of the heat is transmitted via the combustion chamber walls, i.e. primary heat exchanger, to the dwelling air and part is transmitted via the hot products of combustion to a secondary heat exchanger wherein the hot flue gases are cooled to a temperature of about 120° F. by part or all of the dwelling air passing through the furnace thereby recovering by condensation part of the latent heat of the water vapour in the combustion gases. The moisture produced by the condensation process is removed as water through a small drain attached to the secondary heat exchanger. In other embodiments of our invention, three heat exchangers may be used in which the principal amount of heat is transmitted to the dwelling air in the second stage thereby cooling the combustion gases to 300° F. or thereabouts and then passing the said flue gases from the second heat exchanger to a corrosion resistant tertiary heat exchanger wherein the hot flue gases are cooled to a temperature of about 120° F. by part or all of the dwelling air passing through the furnace thereby recovering by condensation part of the latent heat of the water vapour in the combustion gases.

Our invention broadly comprises the combination of an exterior housing having air distribution means for discharging air heated by said furnace, a primary heat exchanger comprising a combustion chamber having a top and a bottom and at least one sidewall for burning a fluid fuel yielding hot gaseous products of combustion positioned within said housing, means substantially enclosing said sidewall of said combustion chamber and spaced therefrom defining a restricted flow path for turbulent passage of air about said combustion chamber, a secondary heat exchanger in communication with said combustion chamber and adapted to receive air in turbulent flow thereabout, for receiving hot gaseous products of combustion from the combustion chamber whereby said gaseous products of combustion are cooled in said secondary heat exchanger to about 120° F. for condensation of at least a portion of condensible gases for substantial recovery of latent heat of condensation of said condensible products of combustion and transfer of said heat to the fluid medium.

In an embodiment of our invention, said means substantially enclosing the sidewall of the combustion chamber and said secondary heat exchanger comprise a closed hollow shell closely spaced from the combustion chamber defining a resticted flow path for turbulent air flow therebetween, a conduit extending between the combustion chamber and secondary heat exchanger in proximity to the top thereof for the passage of hot gaseous products of combustion from the combustion chamber to the secondary heat exchanger, and a conduit extending from the secondary heat exchanger in proximity to the bottom thereof for the discharge of hot gaseous products of combustion, means for forcing air past the heat exchangers, and means for draining condensate from the secondary heat exchanger. The means substantially enclosing the sidewall of the combustion chamber may be an annular shield, and said closed hollow shell preferably comprises a closed annular drum concentric with and spaced from said annular shield defining a narrow flow path for air therebetween, said closed annular drum having an upper annulus and a lower annulus continuous therewith in which said upper annulus is filled with a plurality of segments of randomly packed refractory material permeable to the flow of heating gases therethrough and said lower annulus has annular baffles. The closed annular drum may comprise a single annulus or double annuli, the latter embodiment preferably arranged for countercurrent operation.

The furnace of our invention can additionally comprise finned tube or thermosiphon heat exchangers arranged sequentially with the primary heat exchanger as either secondary or tertiary heat exchangers.

The invention may be particularly applicable to furnace designs which can be made compact because of the reduction in size of the primary heat exchanger and suitable positioning of the secondary heat exchanger and tertiary heat exchanger, if used, and other components.

The furnace installations in accordance with the present invention are high in efficiency and low in operating expenses and provide for safe, reliable operation. Conventional furnace installations can be readily converted, in some embodiments, to the system of the invention. As an indication of the savings resulting from the improved efficiency, it may be pointed out that any increase of additional capital costs for conversion or original construction often can be off-set within a relatively short period of time, e.g. within 3-4 years.

BRIEF DESCRIPTION OF THE DRAWINGS

Other important objects and advantages of the invention will become apparent from the following detailed description of embodiments thereof, in which.

Figure 1:
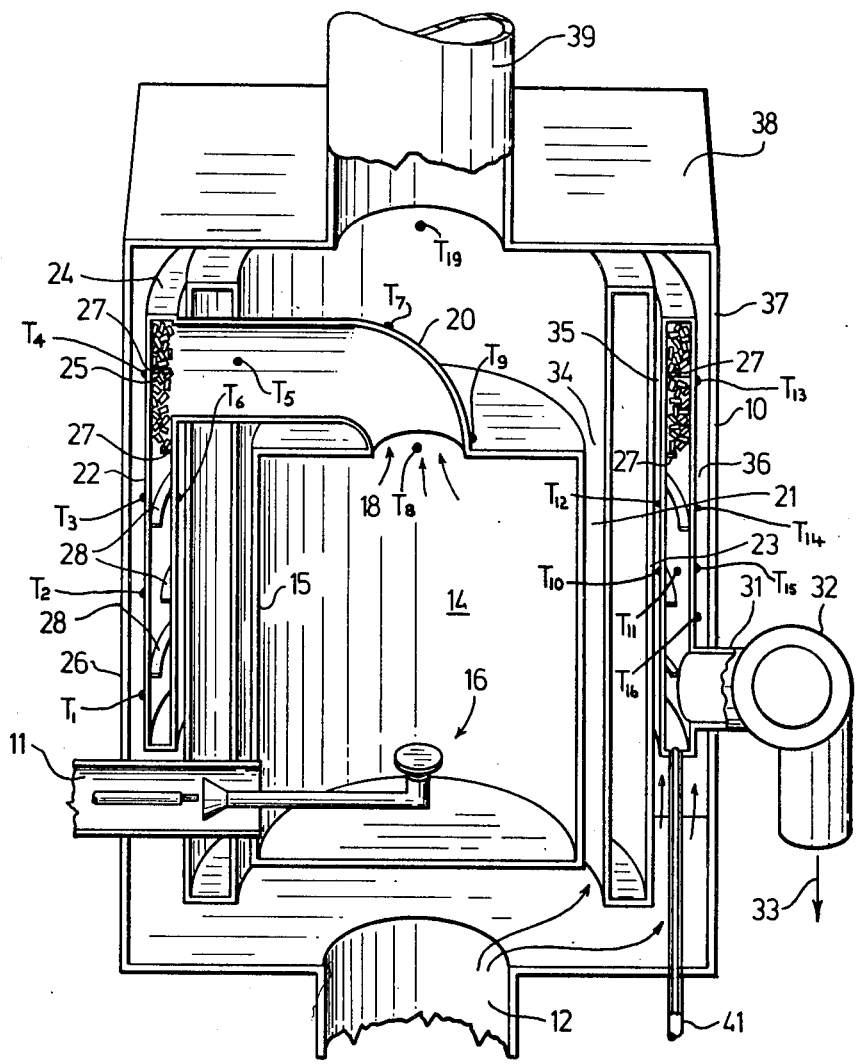
FIG. 1 illustrates, by a vertical section, in perspective, an embodiment of furnace in accordance with the present invention.

With reference now to FIG. 1 of the drawings, a first embodiment of the furnace of the invention, shown in perspective, comprises exterior housing 10 having a side inlet opening 11 for controlled supply of air to the cylindrical combustion chamber 14 having peripheral wall 15 wherein a burner 16 provides a hydrocarbon fuel such as natural gas for combustion. Combustion products pass upwardly, as depicted by arrows 18, through overhead duct 20 into the upper portion 24 of closed annular drum 22 which is concentric with cylindrical chamber 14 and spaced therefrom to define an annulus 21 partially filled by annular heat shield 23.

The upper portion 24 of annular drum 22 is filled with a packing 25 of a plurality of segments of randomly packed metallic or non-metallic non-friable refractory material seated on perforated annular bracket 27. Packing 25, although permeable to the flow of heating gases therethrough, will interact collectively to provide tortuous paths and avoid channelling of the gases within drum 22 which will somewhat impede the gas flow for increased retention time and enhanced heat transfer. Rounded sections of cylindrical metallic tubing, preferably sections of steel pipe or copper tubing about ¾ to 2" in length and ¾ to about 1¼" in diameter, are preferred. The rounded metal sections can additionally be formed of *"glitsch" rings of dimensions similar to the aforesaid pipe sections having tabs punched out of the tubing wall to form fingers that protrude into the center of the ring.
*Trade Mark The shape, dimensions, length to diameter relationship and metal of the tubular sections are important in providing desired function and durability to the structure. The shape of the sectional elements is important such that when the sections are randomly packed within the annular space of section 24, the individual sections do not have flat surfaces which may abut and contact adjacent sections to block the passage of heating gases. A rounded, i.e. circular or elliptical, cross-sectional shape is preferred.

It will be understood that the dimensions of the metallic tubular sections may vary dependent on the annular width. However, it is important that the said dimensions relative to the annulus width permit the sections to be non-orderly packed for desired heat transfer without symmetrical alignment of the sections.

We have found that rounded sections having an average length more than twice the tubing diameter tend to pack in a parallel relationship with each other while sections having an average length less than one-half the tubing diameter tend to stack on edge on each other to close off and unduly obstruct the flow of gases through the flue. An average length to tubing diameter ratio within the range of 0.5:1 to 2:1 has been found satisfactory with a ratio of average length to diameter ratio of about 1:1 preferred.

The heating gases pass downwardly through upper portion 24 into lower portion 26 of annular drum 22 which has at least one annular baffle 28, preferably two or more equally spaced baffles 28 mounted as shown, before discharge through duct 31 and exhaust fan 32 in the direction indicated by arrow 33. The furnace can operate with an atmospheric burner and extraction fan, as shown, or with a power burner, i.e. air supplied under pressure.

Air to be heated enters the furnace by way of basal opening 12 and flows through annular channels 34 and 35 in annulus 21 and through annular channel 36 between drum 22 and outer wall 37 of housing 10. Air heated by combustion chamber wall 15, first-stage heating i.e. primary heat exchanger, and air heated by annular drum 22, second-stage heating, i.e. secondary heat exchanger, is collected by a bonnet 38 for ducting 39 to the rooms to be heated. Air can be supplied under pressure by a blower or induced by a suction fan. Condensate is discharged via drain tube 41.

A test furnace according to the embodiment of FIG. 1 having a height of 5' and diameter of 30" was constructed and tested to evaluate efficiency. In order to permit side firing of the burners through air-tight chambers and to isolate the gas lines and burner from the return air flow, the combustion chamber 14 was extended below the second-stage heat exchanger 22. The heat exchanger 22 was constructed of 304 LC stainless steel with a 24¼" O.D., 22" I.D. and 35" height for a surface area of 31 sq. ft. The top half 24 of the heat exchanger, in which non-condensing heat transfer occurs, was non-orderly packed with ⅜ inch long pieces of Glitsch tubing seated on two peripheral baffles spaced 6" apart to improve heat transfer by two baffles with Glitsch rings sitting on them spaced 6" apart. The lower half of the heat exchanger was fitted with 3 baffles 28 spaced 6" apart to improve heat transfer in the condensing section. A heat shield was installed between the second-stage heat exchanger 22 and the combustion chamber (first-stage heat exchanger) to reduce undesired heating of the cool lower end of the heat exchanger 22 and to maintain a high-velocity turbulent airflow past the said heat exchangers. The furnace was fitted with thermocouples $T_1$–$T_{18}$ and Te (exhaust) to measure air-side temperatures, flue gas temperatures and metal temperatures. These thermocouples were used to monitor potential hot spots, locate the transition from non-condensing to condensing conditions within the furnace and to provide data for calculating the heat transfer load of various sections of the furnace.

The model was tested for steady state efficiency at three points over the firing range from 60,000 to 90,000 BTU/hr.

The furnace was fitted with a hot-air plenum having a cross-sectional area calculated for an air velocity of approximately 900 FPM at 85 Fahrenheit degree temperature rise at the maximum firing rate and its steady state efficiency was tested, as specified in the CGA Standard 2.3, Section 2.14. The latent heat recovered from the condensed combustion products is taken into consideration in calculating the stack loss.

The furnace was tested with an atmospheric burner and extraction fan and operated at about 90% steady state efficiency over the required firing range. Because of the power vent, and the high resistance through the gas passages as a result of the various techniques applied to obtain better heat transfer, air flow through the furnace is virtually negligible when the burner is off. Therefore, the seasonal efficiency of the CGRI high efficiency furnaces approaches steady state values which will be about 90% or more. Efficiency test results are shown in Table 1.

Figure 1A:
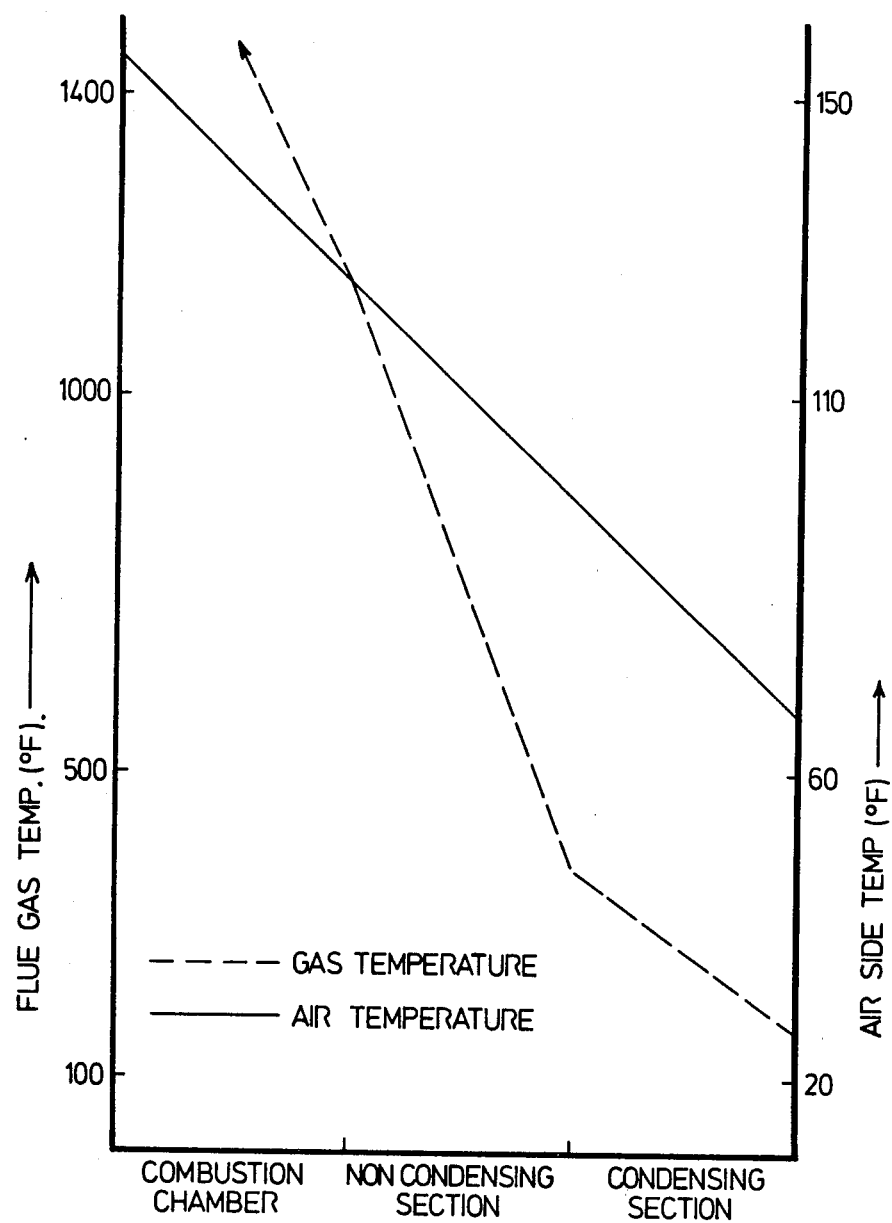
FIG. 1a is a graph depicting the temperature profile of the furnace in accordance with FIG. 1, at a firing rate of 90,800 BUT/hr.

Temperature measurements for the furnace are shown in Table 2, and a temperature profile depicted in FIG. 1a for a firing rate of 90,000 BTU/hr. Thermocouple $T_{11}$, which measured the gas temperature at a point between the packed zone and the baffled zone, recorded temperatures well above the natural gas maximum possible dewpoint (about 140° F.) for all five runs. Thermocouples $T_{10}$ and $T_{15}$ which measured metal temperatures near $T_{11}$ never registered temperatures close to the dewpoint in steady state operation. Because these thermocouples would be expected to register the coldest temperatures in the packed section, it is apparent that condensation was limited ($T_1$ and $T_2$) to the lower or baffled section 26 of the heat exchanger 22. Thermocouples 4, 7, 8 and 9 in potential hot spot locations never measured temperatures over 1000° F. Preliminary jacket loss tests indicated losses of less than 1% of the furnace input at 90,000 BTU/hr.

TABLE 1

EFFICIENCY DATA FOR BAFFLED/PACKED HEAT EXCHANGER

| TEST # | INPUT (BTU/hr) | RETURN AIR TEMP (°F.) | AIR TEMP RISE (°F.) | FLUE GAS CO₂ (%) | FLUE GAS CO (ppm) | EXHAUST TEMP (°F.) | HEAT EXCHANGER CONDENSATE RATE (gm/min) | STACK LOSS % |
|---|---|---|---|---|---|---|---|---|
| 1 | 89,000 | 76 | 87 | 9.8 | 7 | 135 | 10.3 | 11 |
| 2 | 75,000 | 72 | 86 | 9.7 | 8 | 129 | 12 | 10 |
| 3 | 63,000 | 72 | 84 | 8.8 | 5 | 125 | 10 | 10 |

TABLE 2

TEMPERATURE MEASUREMENTS OF BAFFLED/PACKED HEAT EXCHANGER

| THERMOCOUPLE NUMBER | TEMPERATURE °F. TEST 1 | TEST 2 | TEST 3 |
|---|---|---|---|
| 1 | 152 | 149 | 152 |
| 2 | 160 | 164 | 166 |
| 3 | 585 | 605 | 614 |
| 4 | 764 | 775 | 790 |
| 5 | 1180 | 1190 | 1245 |
| 6 | 682 | 670 | 709 |
| 7 | 760 | 739 | 761 |
| 8 | 774 | 769 | 788 |
| 9 | 860 | 905 | 907 |
| 10 | 253 | 224 | 247 |
| 11 | 379 | 320 | 361 |
| 12 | 261 | 234 | 256 |
| 13 | | | |
| 14 | 213 | 191 | 203 |
| 15 | 228 | 205 | 223 |
| 16 | 165 | 250 | 162 |

Figure 2:
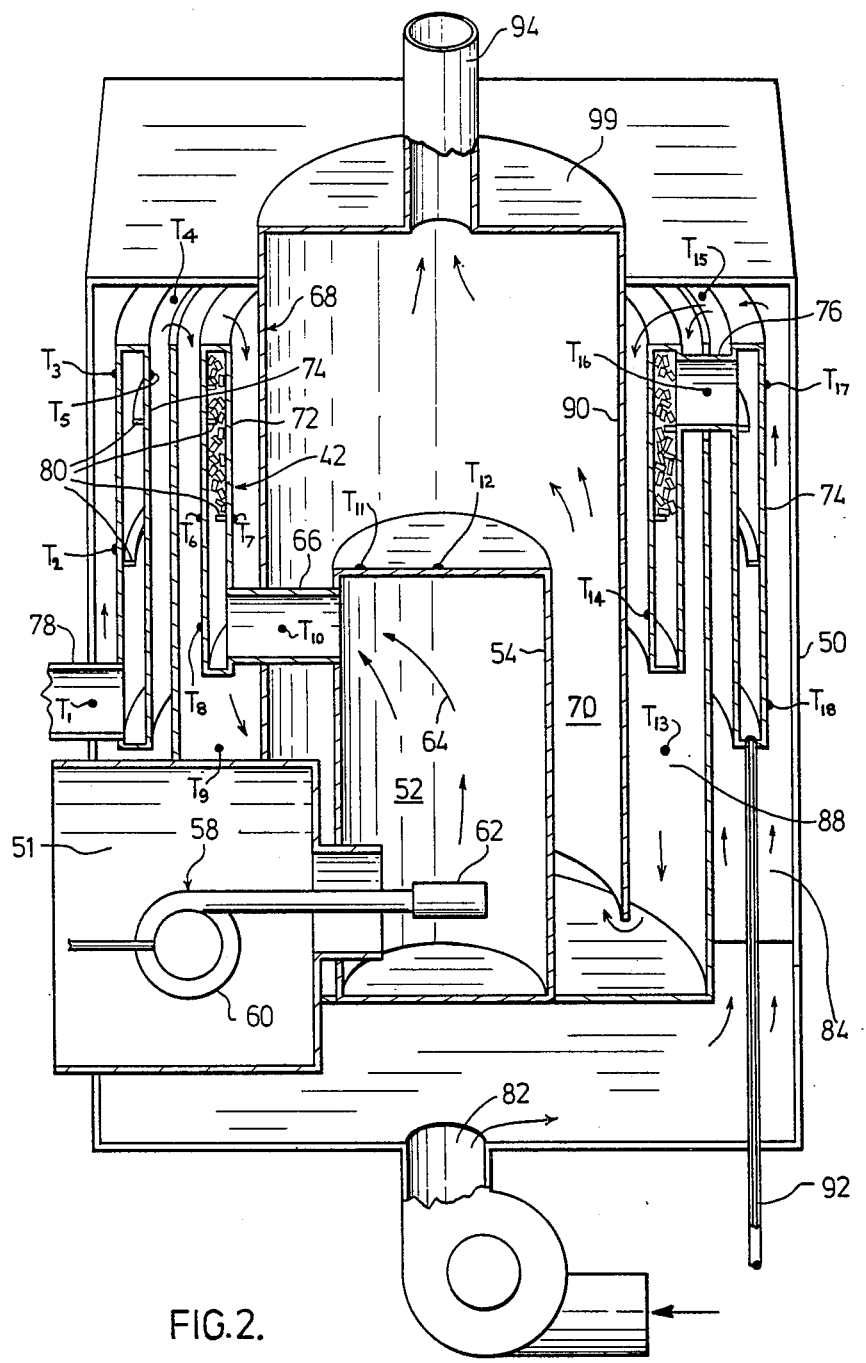
FIG. 2 illustrates, by a vertical section, in perspective, another embodiment of furnace in accordance with the present invention.

In accordance with another embodiment of the invention, a furnace installation is provided whwerein the second-stage heat exchanger comprises a double annuli, i.e. two concentric hollow rings within a drum; employing a counter-current air flow. This embodiment is shown in FIG. 2 wherein the furnace comprises housing 50 having a side inlet opening 51 leading to cylindrical combustion chamber 52 having peripheral wall 54 for controlled supply of natural gas and air thereto by power burner 58 consisting of an air blower 60 which mixes combustion gas and air for delivery under pressure through stainless steel nozzle 62. Hot combustion products pass upwardly, as depicted by arrows 64, through duct 66 into the lower portion of open bottom drum 68 which is concentric with cylindrical combustion chamber 52 and spaced therefrom to define an annulus 70.

Annular drum 42 comprises a pair of spaced-apart concentric, hollow rings 72, 74 adapted to receive combustion gases from chamber 52 through duct 66 connected with inner ring 72 which is interconnected with outer ring 74 by overhead duct 76 diametrically opposed to inlet duct 66. Heating gases are discharged via exhaust duct 78 after travelling through inner ring 72 from central inlet duct 66 to overhead duct 76 and through outer ring 74 to exhaust duct 78.

A plurality of spaced baffle rings 80 positioned within concentric rings 72, 74 increases the length of path the flue gases must travel thereby increasing its velocity and turbulence for improved heat transfer. Inner ring 72 may be partially filled with randomly packed refractory material, if desired, for enhanced heat transfer.

Air to be heated enters the furnace by way of basal opening 82 and flows upwardly through annular channel 84 defined by outer housing 50 and cylindrical divider wall 86 about both sides of outer ring 74 and downwardly through annular channel 88 defined between divider wall 86 and inner cylindrical wall 90 of drum 68 into the annulus 70 defined between the cylindrical sidewall 54 of combustion chamber 52 and drum wall 90 to be collected by bonnet 99 for discharge through outlet duct 94. The air to be heated thus flows countercurrent to the flow of heating gases. Condensate collected in outer condensing heat ring 74 is discharged through drain pipe 92.

A test furnace was constructed according to FIG. 2 with two concentric heat exchanger rings 72,74 of 22" O.D. and 28" O.D. respectively in the second stage heat exchanger. Both heat rings had a one inch wide interior gas passage and were baffled. Unlike conventional baffling which is welded into place, the baffles in these heat exchanger rings were welded to supporting rods, not shown, and suspended in position before closing of the heat exchanger rings. This step not only reduced the amount of welding required in construction, but reduced the number of possible corrosion sites.

The air side was designed as illustrated so that the air flow was countercurrent to the flue gas flow. Return air first passed over the outside or condensing heat ring and then to the inner or non-condensing heat ring and then past the combustion chamber of the first-stage heat exchanger. This configuration reduced furnace casing loss by directing cool return air across the inside of the casing. Because condensation occurred only in the outer heat exchange ring, the walls and baffles of ring 74 were made of 304 LC stainless steel, while the inner heat exchanger ring 72 and its baffles were made from mild steel.

The furnace was fitted with thermocouples to measure air side temperatures, flue gas temperatures and metal temperatures. These thermocouples were used to monitor potential hot spots, locate the transition from non-condensing to condensing conditions in the flue gas side and to provide data for calculating the heat transfer load of various sections of the furnace. The positions of the thermocouples are shown in FIG. 2. The furnace was fitted with a hot air plenum with a cross-sectional area calculated for an air velocity of approximately 900 FPM at an 85 Fahrenheit degree temperature rise at the maximum firing rate, as specified in the CGA Standard 2.3, Section 2.14. The embodiment of FIG. 2 was then tested for steady state efficiency at three points over the firing range from 60,000 to 90,000 BTU/hr. To minimise off-time losses, the furnace was designed to operate with either power burner or with an atmospheric burner and an extraction fan. The combustion chamber on the model was extended below the heat exchanger to permit side firing of the burner through air tight chambers, thus isolating the gas line and burner from the return air flow.

For testing purposes, the counterflow furnace was fired with a power burner. The result of the efficiency tests are shown in Table 3. The counterflow furnace operated at about 94% steady state efficiency over the required firing range.

Figure 2A:
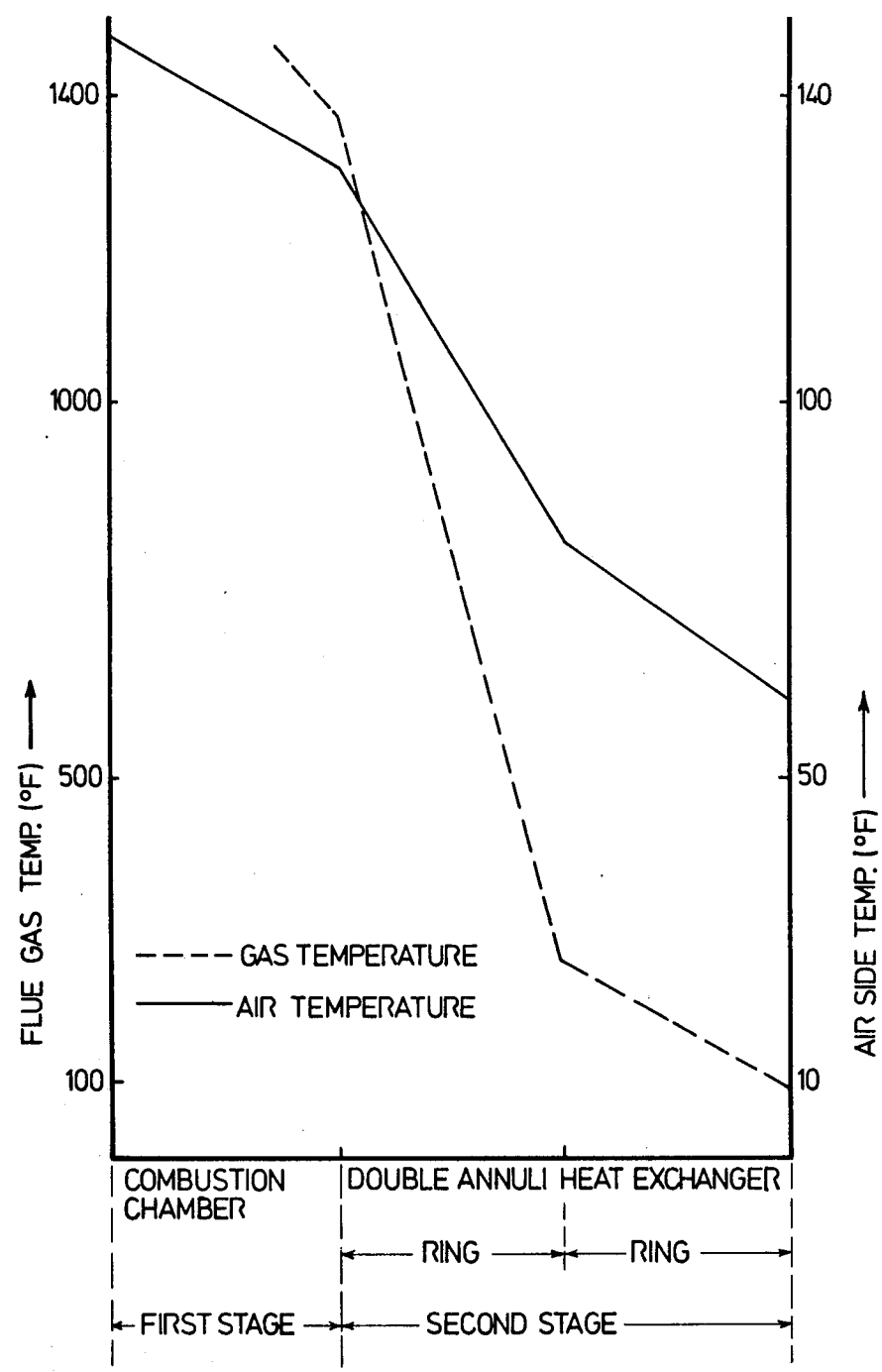
FIG. 2a is a graph depicting the temperature profile of the furnace in accordance with FIG. 2, at a firing rate of 63,000 BTU/hr.

The temperature measurements recorded from each run are shown in Table 4, and a temperature profile depicted in FIG. 2a for a firing rate of 90,000 BTU/hr. Thermocouple $T_{16}$ which is in the flue gas stream between the inner and outer heat rings 72,74 never dropped below the theoretical maximum dewpoint of 140° C. The metal temperature thermocouples $T_6$ and $T_7$ placed midway on the inner ring 72 also were well above the maximum dewpoint. This indicates that condensation was limited to the outer ring. Thermocouples $T_{11}$ and $T_{12}$, placed on the top of the combustion chamber at likely hot spots, did not register temperatures above 1000° F. and thermocouple $T_8$, placed where hot gas from the combustion chamber impinged on the heat exchanger wall, also did not register over 1000° F. These readings indicate that high temperature failure will not occur.

TABLE 3

EFFICIENCY DATA FOR BAFFLED COUNTERCURRENT FLOW HEAT EXCHANGER

| TEST # | INPUT (BTU/hr) | RETURN AIR TEMP (°F.) | AIR TEMP RISE (°F.) | FLUE GAS CO$_2$ (%) | FLUE GAS CO (ppm) | EXHAUST TEMP (°F.) | HEAT EXCHANGER CONDENSATE RATE (gm/min) | STACK LOSS % |
|---|---|---|---|---|---|---|---|---|
| 1 | 92,000 | 60 | 87 | 9.8 | 5 | 116 | 26.7 | 8 |
| 2 | 77,300 | 60 | 84 | 9.8 | 5 | 112 | 26.5 | 7 |
| 3 | 62,700 | 60 | 83 | 9.4 | 4 | 110 | 23.5 | 6 |

TABLE 4

TEMPERATURE MEASUREMENTS OF BAFFLED COUNTERCURRENT FLOW HEAT EXCHANGER

| THERMOCOUPLE NUMBER | TEMPERATURE °F. | | |
|---|---|---|---|
| | TEST 1 | TEST 2 | TEST 3 |
| | 92,000 | 62,700 | 77,300 |
| 1 | 116 | 108 | 112 |
| 2 | 119 | 116 | 117 |
| 3 | 125 | 123 | 124 |
| 4 | 84 | 82 | 83 |
| 5 | 127 | 124 | 126 |
| 6 | 345 | 278 | 307 |
| 7 | 289 | 246 | 265 |
| 8 | 915 | 768 | 848 |
| 9 | 142 | 134 | 136 |
| 10 | 1370 | 1250 | 1300 |
| 11 | 646 | 602 | 627 |
| 12 | 772 | 721 | 755 |
| 13 | 117 | 111 | 113 |
| 14 | 374 | 299 | 331 |
| 15 | 81 | 79 | 81 |
| 16 | 261 | 213 | 234 |
| 17 | 187 | 158 | 171 |
| 18 | 109 | 105 | 108 |

The overall heat transfer coefficients at the firing rate of 92,000 BTU/hr. were 8.4 for the outer or condensing heat ring 74 and 5.2 for the inner or non-condensing heat ring 72. The higher heat transfer coefficient for the outer ring is believed to reflect the improvement in heat transfer caused by the condensing flue gas wetting the walls of the heat exchanger. Countercurrent flow within the two drum heat exchanger furnace improved the steady state efficiency.

In accordance with yet another embodiment of the invention, a furnace installation is provided wherein a third-stage heat exchanger is provided which comprises an assembly of finned tube corrosion resistant elements. A furnace, shown in perspective in FIG. 3, comprises a housing 101, through which is drawn combustion air to the side opening 102 in the combustion chamber 103 (first-stage heat exchanger) containing the burner 104 which provides a hydrocarbon fuel such as natural gas for combustion. Combustion products pass upwardly as depicted by arrows 105 through overhead duct 106 into the upper portion of closed annular drum 107 (second-stage heat exchanger) which is concentric with cylindrical chamber 103 and spaced therefrom to define annulus 108. The combustion gases pass downwardly through annular drum 107 and then through connecting duct 109 to upper manifold 110 in which sits perforated deflector plate 111. The combustion gases are forced to diffuse through this plate thereby distributing the combustion gas flow across the entire area of the manifold 110 and into finned tubes 112. It will be understood that the size and spacing of the perforations in plate 111 are important. The size and spacing of the holes must be such that a good distribution of flow of the combustion gases occurs over the entire area of the plate and yet not cause an unacceptably high pressure drop across the plate.

We have found that a plate with 10% open area in the form of ⅛" diameter holes staggered ½" apart is satisfactory. The construction of finned tube 112 is important too. The inside of the tubes, through whch the corrosive combustion gases flow and condensation occurs, must be of a material resistant to corrosion such as 304 LC stainless steel. The outside of the tubes must have a large effective heat transfer area and must have good thermal conductivity. We have found that fins made of aluminum, equi-spaced 11 fins/inch perform in the desired fashion. There must be good mechanical contact between the fins and the tube. Integral aluminum fins and stainless steel liner is a suitable arrangement.

The combustion gases flow through the tubes 112 which may have turbulators 113 thereon such as twisted metal strips which impart turbulence to the low velocity combustion gases and thereby enhance heat transfer. The combustion gases pass from the tubes 112 into the lower manifold 114, which is made of a corrosion resistant material such as 304 LC stainless steel or the like, through duct 115 to exhaust fan 116 then through duct 117 leaving the furnace.

Dwelling air 99 entering the furnace first passes finned tubes 112, thereby cooling said tubes to the maximum possible amount, through a circulating fan in casing 118, past combustion chamber 103 and through annuli 108 and 119. Annulus 119 is provided by cylindrical wall 130 concentric with and spaced from drum 107. We have found that the size of annuli 108 and 119 to be important to the heat exchange efficiency of the primary heat exchanger. For a furnace with input capacity of 90,000 BTU/hr, we have found that the width of annuli 119 should be about ¾" and annuli 108 should be about 2". Heated dwelling air then leaves the furnace via opening 120 and duct 121. The embodiment of FIG. 3 was tested according to CGA Standard 2.3, Section 2.14 for steady state efficiency at three points over the firing range 60,000 to 90,000 BTU/hr. In calculating the stack loss, the latent heat of the water collected by condensation in the secondary heat exchanger was subtracted from that remaining uncondensed within the flue gas. Efficiencies of about 90% were obtained for each firing rate. Test results are presented in Table 5.

TABLE 5

| | | | | FLUE GAS | | | | |
|---|---|---|---|---|---|---|---|---|
| TEST # | INPUT (BTU/hr) | RETURN AIR TEMP (°F.) | AIR TEMP RISE (°F.) | $CO_2$ (%) | CO (ppm) | EXHAUST TEMP (°F.) | HEAT EXCHANGER CONDENSATE RATE (gm/min) | STACK LOSS % |
| 1 | 92,000 | 74 | 83 | 8.7 | 4 | 149 | 31.6 | 8 |
| 2 | 76,000 | 71 | 86 | 8.5 | 4 | 132 | 31 | 7 |
| 3 | 59,000 | 70 | 86 | 8.5 | 3 | 114 | 25 | 6 |

Figure 3:
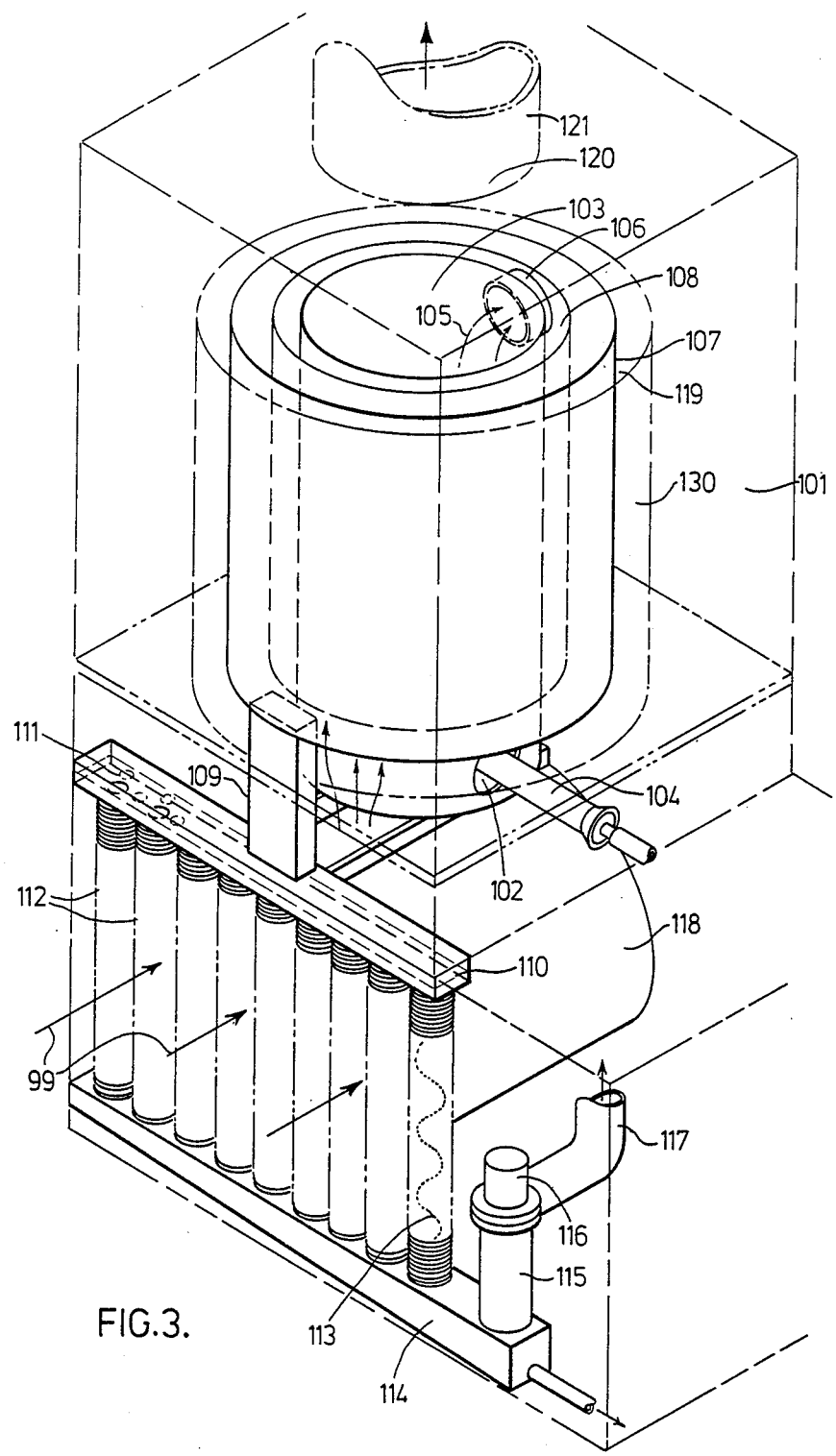
FIG. 3 is a perspective view illustrating a further embodiment of furnace of the present invention having a finned tube heat exchanger.
Figure 4:
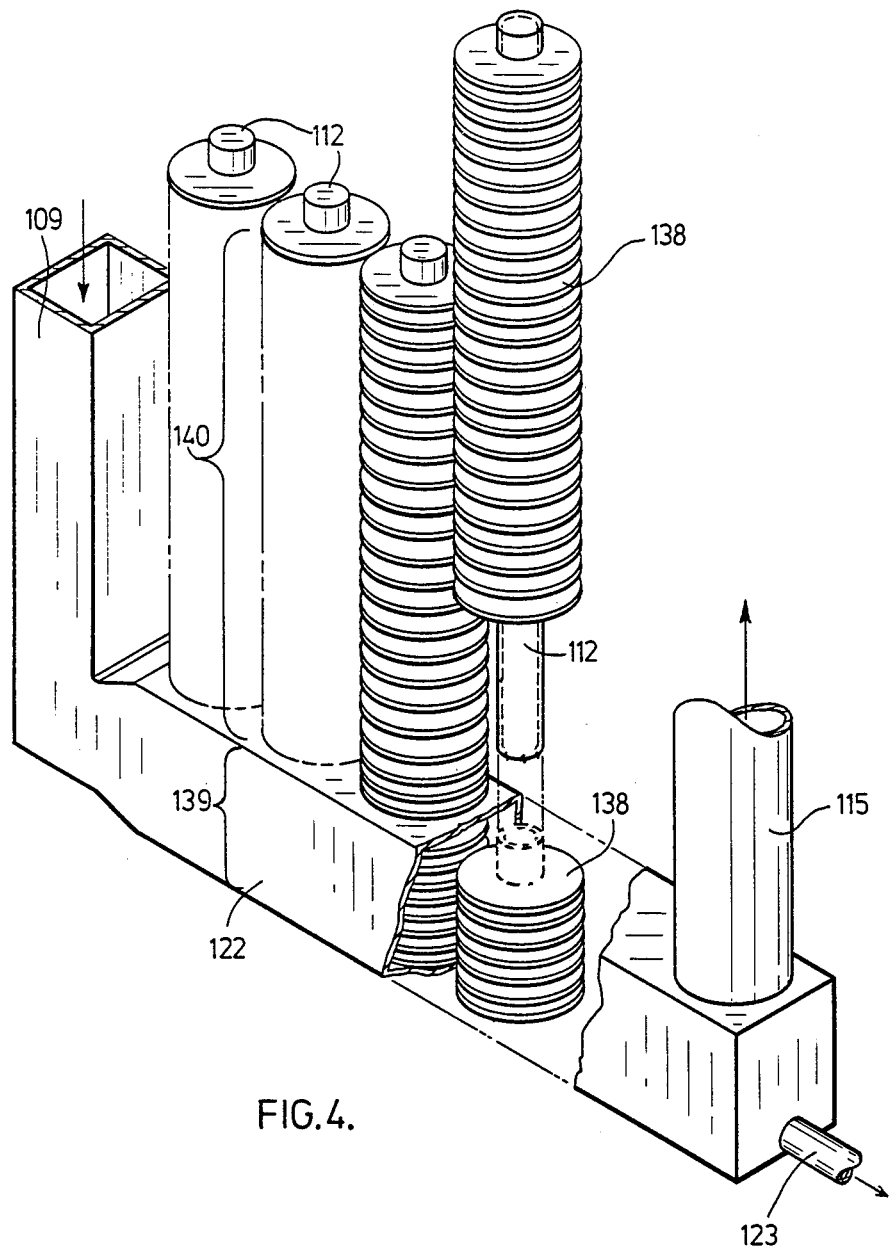
FIG. 4 is a perspective view, partly cut away, which illustrates a thermosiphon exchanger in the furnace of the present invention.

In accordance with still another embodiment of the invention FIG. 4, a furnace installation is provided wherein the secondary heat exchanger comprises a set of thermosiphon tubes 121 having fins 138 placed such that the flue gas from duct 109 passes over the evaporator section 139 of the thermosiphons in manifold 122 and then to exhaust duct 115. Condensation forming on the evaporator section 139 of the thermosiphon tubes is drained from the manifold 122 via drain tube 123. Cool dwelling air first entering the furnace passes over the condenser sections 140 of the thermosiphons thereby receiving heat from them before possing through a circulating fan and on past the secondary heat exchanger, as shown in FIG. 3. We have found that the size and placement of the thermosiphons is critical for effective extraction of the low temperature heat from the combustion gases. Thermosiphons of total length 30", fin O.D. of 2", tube I.D. of ⅝" having an evaporator to condenser length ratio of about 1:3.5, work satisfactorily. The thermosiphons allow maximum condensation of the combustion gases when they are arranged such that the combustion gas passes the thermosiphons in a pre-determined sequence such that some thermosiphons downstream of other thermosiphons have cooler combustion gas pass over them. This allows the last thermosiphons to condense a maximum amount of water. We have found four thermosiphons in a linear arrangement to be effective.

The material and construction of the thermosiphons is important. The outside surface of the thermosiphons must be able to conduct heat with a low temperature difference to the heat transfer medium inside the thermosiphons. The outside of the evaporator sections must be corrosion resistant where contact with condensing flue gas occurs. The material on the inside of the thermosiphon tubes must be a good heat conductor and must be compatible with the heat transfer medium such that corrosion or unwanted chemical reactions do not occur. We have found that thermosiphon tubes constructed of aluminum fins integral with cupronickel liners are satisfactory. The fin spacing is important because a small fin spacing may contribute to clogging of the fins on the evaporator sections of the thermosiphons while a large fin spacing will reduce the rate of heat transfer from the dwelling air to the condensing sections of the thermosiphons. We have found a fin spacing of 9 fins per inch to satisfy these requirements. Another factor of importance is the size of manifold 22 in relation to the fin O.D. of the thermosiphon. The inside dimensions of the manifold should be such that there is a minimum clearance between the manifold walls and the fins of the evaporator section of the thermosiphons. The minimum clearance forces the combustion gases into intimate contact with the thermosiphon fins, thereby improving heat transfer. We have found that a clearance of less than 1/8" is desirable. The properties of the heat transfer medium inside the thermosiphons are important. Because a thermosiphon works on the basis of transferring heat through latent heat of evaporation and condensation of the heat transfer medium, the latent heat of evaporation and condensation should be as high as possible and the boiling temperature at the internal operating pressure of the thermosiphon should be lower than the combustion gas temperature in contact with the thermosiphon. The heat transfer medium should also be compatible with the thermosiphon tube material. We have found that water is a suitable heat transfer medium for this application when the thermosiphons are constructed according to standard practice. This embodiments was also tested for steady state efficiency in accordance with CGA Standard 2.3, Section 2.14, with allowance for combustion gas condensation. The results are presented in Table 6.

TABLE 6

| | | EFFICIENCY DATA FOR THERMOSIPHON HEAT EXCHANGER | | | | | | |
|---|---|---|---|---|---|---|---|---|
| TEST # | INPUT (BTU/hr) | RETURN AIR TEMP (°F.) | AIR TEMP RISE (°F.) | FLUE GAS CO$_2$ (%) | FLUE GAS CO (ppm) | EXHAUST TEMP (°F.) | HEAT EXCHANGER CONDENSATE RATE (gm/min) | STACK LOSS % |
| 1 | 70,800 | 71 | 84 | 9.5 | 25 | 140 | 10 | 11 |
| 2 | 63,300 | 76 | 85 | 9.4 | 4 | 136 | 9 | 10 |

Figure 5:
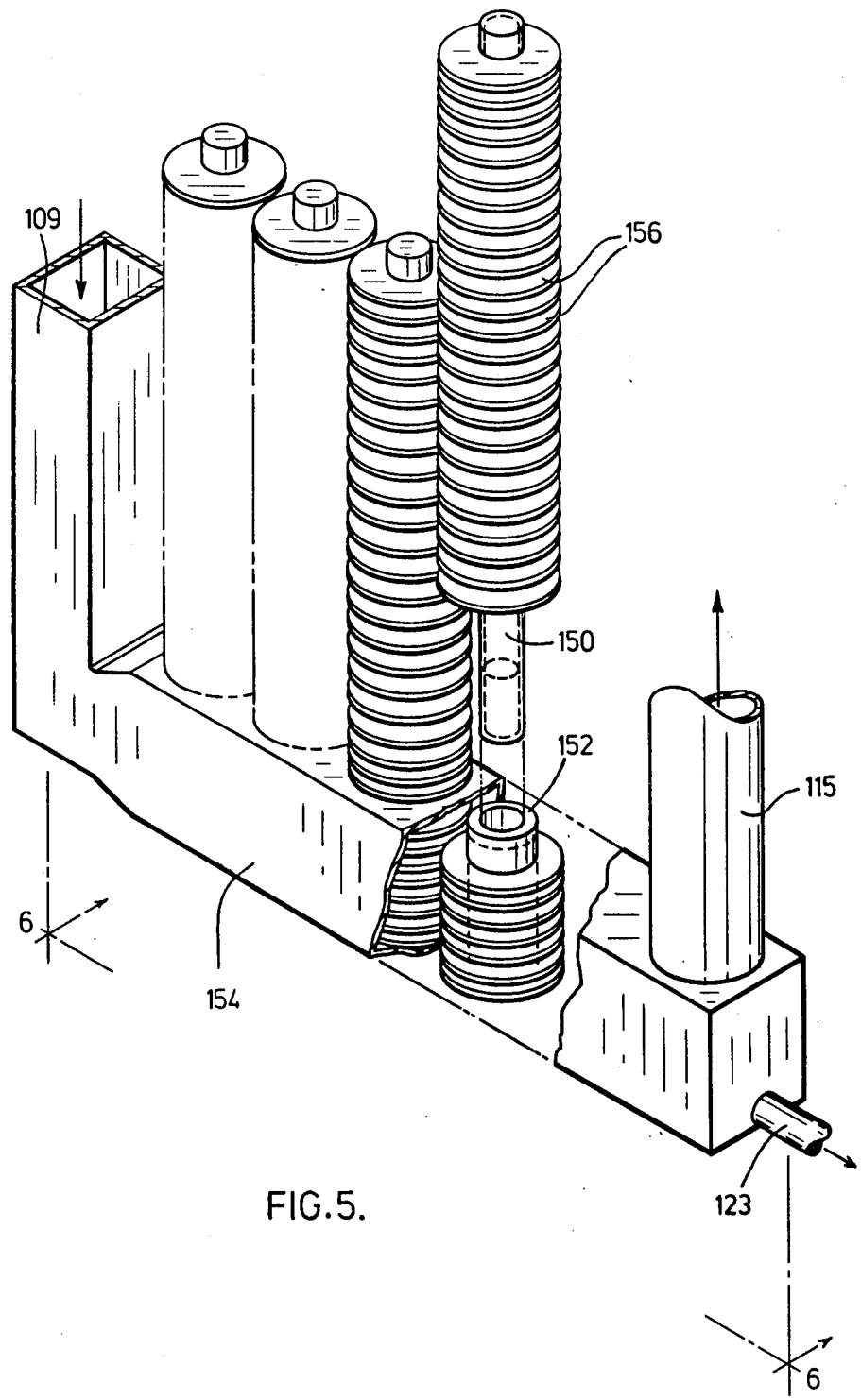
FIG. 5 is a perspective view, partly cut away, of another embodiment of thermosiphon heat exchanger.
Figure 6:
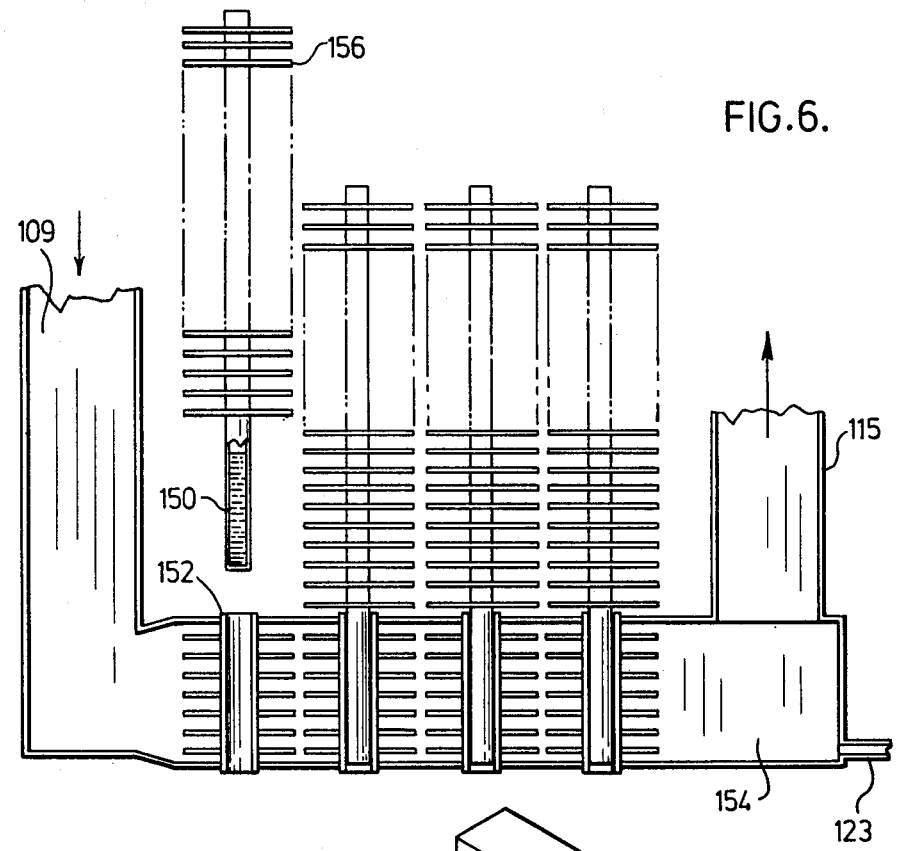
FIG. 6 is a vertical section along the line 6—6 of FIG. 5.
Figure 7:
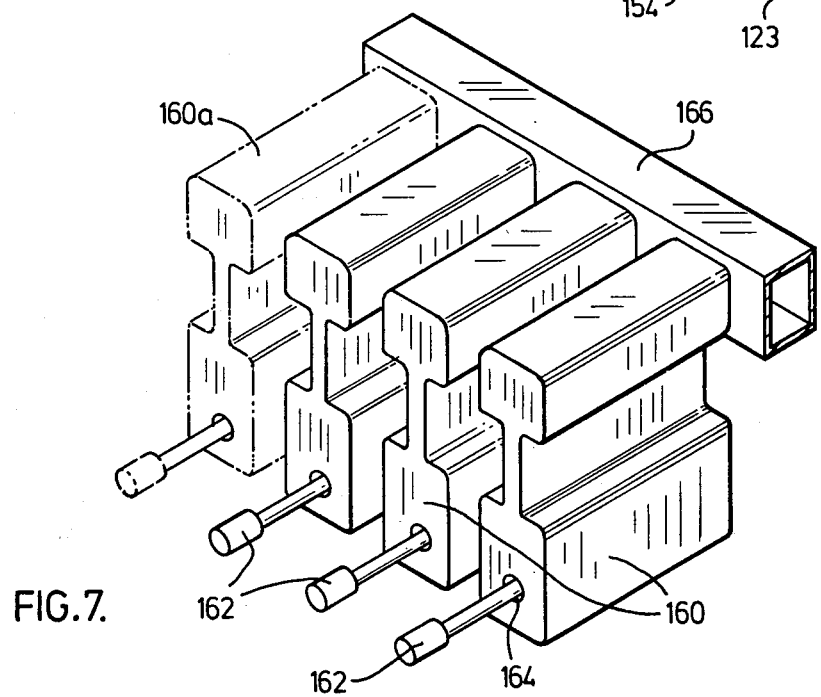
FIG. 7 is a perspective view of sectional combustion chamber.

In accordance with another embodiment of the invention, as shown in FIGS. 5 and 6, a furnace installation is provided wherein a plurality of thermosiphon tubes 150 fit into wells 152 within manifold 154 and are removable from said wells for maintenance or repair. The wells should have similar properties to those ascribed to the evaporator sections in the previous embodiment of FIG. 5. The outside of the wells and fins 156 should have a large surface area, be corrosion resistant and have good thermal conductivity. In addition, the inside diameter of the well 152 relative to the diameter of tube 150 should be such that a friction fit and good thermal contact are achieved with the evaporation section of the thermosiphon. We have found that copper finned tubing with 6 fins/inch, fin height of 7/16", fin O.D. of 2", tube I.D. of 1", coated with 0.006–0.009" of Teflon*, satisfy these requirements. We have also found that if the inside diameter of the wells and the outside diameter of the evaporation sections of the thermosiphons are such that a tight mechanical fit is obtained, good thermal contact can be achieved by coating the joining surfaces with a material such as a zinc oxide heat transfer paste before assembly.
*Trade Mark FIG. 7 illustrates a sectional combustion chamber which may be used in the furnace of the invention as a primary heat exchanger. Each section 160 has a burner 162 and air inlet opening 164 for admission of combustion air; the combustion products being collected by manifold 166 for transfer to a secondary heat exchanger of the types described above. The chamber 160a shown by ghost lines, illustrates the possible addition of sectional combustion chambers to adapt the primary heat exchanger to customer's heat requirements.

Although the preceding description has shown the finned tube and thermosiphon embodiments of heat exchangers as tertiary units, it will be understood that the said heat exchangers, shown in FIGS. 3–6, can be used as secondary heat exchangers in conventional hot air furnaces by conducting hot combustion products from the furnace combustion chambers via conduit 109 to these units which are arranged to provide a countercurrent heating of dwelling air by first passing the said heating air over the second-stage heat exchangers as typified by the embodiment of FIG. 3 before said air comes into contact with the first-stage heat exchanger.

What we claim as new and desire to protect by Letters Patent of the United States is:

1. A furnace comprising an exterior housing having air distribution means for discharging air heated by said furnace; a primary heat exchanger comprising a central combustion chamber having a top and a bottom and at least one sidewall for burning a fluid fuel yielding hot gaseous products of combustion positioned within said housing; a secondary heat exchanger in communication with said combustion chamber and adapted to receive air in turbulent flow thereabout, for receiving hot gaseous products of combustion from the combustion chamber; means substantially enclosing the sidewall of said combustion chamber intermediate the said combustion chamber sidewall and at least a portion of the secondary heat exchanger and spaced therefrom defining a restricted flow path for turbulent passage of air about said combustion chamber and secondary heat exchanger and shielding the said portion of the secondary heat exchanger from radiation from the combustion chamber whereby said gaseous products of combustion are cooled in said secondary heat exchanger to about 120° F. for condensation of at least a portion of condensible gases for substantial recovery of latent heat of condensation of said condensible products of combustion and transfer of said heat to the discharging air; and means for draining condensate from the secondary heat exchanger.

2. A furnace as claimed in claim 1, in which said means substantially enclosing the sidewall of the combustion chamber intermediate the combustion chamber sidewall and said secondary heat exchanger comprises a hollow annular shield closely spaced from the combustion chamber and the secondary heat exchanger defining restricted flow paths for turbulent air flows therebetween, a conduit extending between the combustion chamber and secondary heat exchanger in proximity to the top thereof for the passage of hot gaseous products of combustion from the combustion chamber to the secondary heat exchanger, and a conduit extending from the secondary heat exchanger in proximity to the bottom thereof for the discharge of hot gaseous products of combustion, and means for forcing air past the heat exchangers.

3. A furnace as claimed in claim 2, in which the combustion chamber is a cylindrical drum and said means substantially enclosing the sidewall of the combustion chamber intermediate the sidewall and said secondary heat exchanger comprises an annular shield concentric with and spaced from said cylindrical drum defining a narrow flow path for air therebetween and shielding the secondary heat exchanger from the combustion chamber; means concentric with and spaced on the exterior of the secondary heat exchanger for defining a narrow flow path for air on the exterior of the secondary heat exchanger, a conduit extending between and communicating the one end of the combustion chamber and the corresponding end of said secondary heat exchanger in proximity to the ends thereof for the passage of hot gaseous products of combustion from the combustion chamber to the secondary heat exchanger; a conduit extending from the secondary heat exchanger in proximity to the opposite end thereof for the discharge of hot gaseous products of combustion from the secondary heat exchanger; drainage means for draining condensate from the secondary heat exchanger; and means for forcing air at high velocity for turbulent flow through the annuli defined between the cylindrical drum, shield and the secondary heat exchanger and between the secondary heat exchanger and exterior means.

4. A furnace as claimed in claim 2, in which the combustion chamber is an upstanding cylindrical drum, said means substantially enclosing the sidewall of the combustion chamber is an annular shield interposed between the combustion chamber and secondary heat exchanger, and said secondary heat exchanger comprises a closed annular drum concentric with and spaced from said annular shield defining a narrow flow path for air therebetween, means concentric with and spaced on the exterior of the secondary heat exchanger for defining a narrow flow path for air on the exterior side of said latter means, a conduit extending between and communicating the upper end of the combustion chamber and said secondary heat exchanger in proximity to the tops thereof for the passage of hot gaseous products of combustion from the combustion chamber to the secondary heat exchanger, a conduit extending from the secondary heat exchanger in proximity to the bottom thereof for the discharge of hot gaseous products of combustion from the secondary heat exchanger, said closed annular drum comprises an upper annulus and a lower annulus in which said upper annulus contains two baffles and is filled with a plurality of segments of randomly packed metallic or non-metallic non-friable refractory material permeable to the flow of heating gases therethrough for enhanced heat transfer to the fluid medium, and means for forcing air at high velocity through the annuli defined between the cylindrical drum, the annular shield, the secondary heat exchanger and exterior of the secondary heat exchanger.

5. A furnace as claimed in claim 4, in which said refractory material is rounded sections of cylindrical metallic tubing.

6. A furnace as claimed in claim 4, in which said lower annulus has at least one annular baffle.

7. A furnace as claimed in claim 4, in which said lower annulus has at least a pair of axially spaced opposed annular baffles.

8. A furnace as claimed in claims 2, 4 or 5, in which a power burner or power exhaust is provided for forcing hot gaseous products of combustion through the primary and secondary heat exchangers.

9. A furnace as claimed in claim 2, in which said primary heat exchanger comprises an upstanding cylindrical drum centrally located within the housing and said secondary heat exchanger comprises a closed double annuli drum having two hollow concentric rings concentric with and spaced from said cylindrical drum, means substantially enveloping the exterior side of said secondary heat exchanger defining a narrow flow path about the secondary heat exchanger, means communicating the combustion chamber with the inner of the hollow concentric rings at one end of the said concentric ring, conduit means communicating the inner hollow concentric ring with the outer concentric ring at the opposite end of the concentric rings, conduit means extending from the outer concentric ring for discharge of hot combustion products therefrom, and partition means interposed between said hollow concentric rings cooperating with said means substantially enclosing the sidewall of the combustion chamber intermediate said secondary heat exchanger and said combustion chamber for shielding the outer concentric ring from the combustion chamber and permitting countercurrent flow of air sequentially past the outer and inner hollow concentric rings and past said combustion chamber whereby said air is heated countercurrent to the flow of combustion gases.

10. A furnace as claimed in claim 9 having conduit means diametrically opposed to said first conduit in proximity to the tops of the hollow concentric rings and interconnecting said hollow concentric rings, and conduit means extending from said outer hollow concentric ring in proximity to the bottom thereof diametrically opposed to said upper conduit means.

11. A furnace as claimed in claim 10, in which said inner hollow concentric ring is at least partially filled with a plurality of segments of randomly packed metallic or non-metallic non-friable refractory material permeable to the flow of heating gases therethrough for enhanced heat transfer.

12. A furnace as claimed in claim 11, in which said refractory material is rounded sections of cylindrical metallic tubing.

13. A furnace as claimed in claim 4, 11 or 12, in which said rounded metallic sections have an average length to diameter ratio within the range of 0.5:1 to 2:1.

14. A furnace as claimed in claim 4, 11 or 12, in which said rounded metallic sections are formed from cylindrical steel or stainless steel pipe or copper tubing about ¾ to 2" in length and about 3/5" to 1¼" in diameter.

15. A furnace as claimed in claim 4, 11 or 12 in which said rounded metallic sections are circular or elliptical in cross-section and have a thin wall thickness.

16. A furnace as claimed in claim 4, 11 or 12, in which at least one of said inner and outer hollow rings has at least a pair of axially spaced opposed annular baffles.

17. A furnace as claimed in claim 3 which additionally comprises a tertiary heat exchanger including a pair of spaced-apart opposed manifolds, a plurality of parallel, equispaced finned tubes interconnecting said manifolds and conduit means from the secondary heat exchanger interconnecting the secondary heat exchanger to the tertiary heat exchanger, said tertiary heat exchanger arranged in the exterior housing whereby air to be heated passes said tertiary heat exchanger before contact with the secondary heat exchanger, and drainage means for draining condensate from said tertiary heat exchanger.

18. A furnace as claimed in claim 17, in which a preferred deflector plate is disposed in one of said manifolds transverse to the finned tubes whereby gas passing through said manifolds is equally distributed among the finned tubes.

19. A furnace as claimed in claim 3, which additionally comprises a tertiary heat exchanger including a manifold, an inlet conduit for communicating said manifold to the secondary heat exchanger, an exhaust conduit for discharge of combustion products from said manifold, drainage means for discharge of condensate from said manifold, and a plurality of parallel, equispaced, upstanding thermosiphons, each having a lower evaporator section and an upper condenser section and a low-boiling liquid therein mounted in said manifold whereby the lower evaporator sections of the thermosiphons are seated in the manifold for exposure of hot combustion gases thereto for vaporization of the liquid in the thermosiphons and the upper condenser sections of the thermosiphons are exposed to air to be heated for transfer of heat to said air by condensation of vaporized liquid in the thermosiphons.

20. A furnace as claimed in claim 19, in which said inlet conduit is located at one end of the manifold and the exhaust conduit is located at the opposite end of the manifold, and the upstanding thermosiphons are linearly seated in the manifold.

21. A furnace as claimed in claim 20, in which the ratio of length of evaporator section to condenser sections is about 1:3.5.

22. A furnace as claimed in claim 21, in which said manifold has a plurality of wells seated transversely within the manifold, each of said wells comprising a tube of a corrosion resistant material having a plurality of fins formed on the exterior thereof, and each of said thermosiphons has a tubular extension adapted to seat in a well in tight-fitting engagement.

23. A furnace as claimed in claim 22, in which each of said wells comprises a copper tube having copper fins formed integral therewith coated with teflon, said fins having a diameter substantially equal to the width of the manifold.

24. A furnace comprising an exterior housing having air distribution means for discharging air heated by said furnace; a primary heat exchanger comprising a combustion chamber having a top and a bottom and at least one sidewall for burning a fluid fuel yielding hot gaseous products of combustion positioned within said housing; a secondary heat exchanger in communication with said combustion chamber and adapted to receive air in turbulent flow thereabout, for receiving hot gaseous products of combustion from the combustion chamber; a tertiary heat exchanger in communication with said secondary heat exchanger for receiving hot gaseous products of combustion from the secondary heat exchanger at a temperature above the dewpoint of any condensible gases, said tertiary heat exchanger comprising a pair of spaced apart opposed manifolds, a plurality of parallel, equispaced finned tubes interconnecting said manifolds, and drainage means for draining condensate from said tertiary heat exchanger, said tertiary heat exchanger arranged in the exterior housing whereby air to be heated passes said tertiary heat exchanger before contact with the secondary heat exchanger whereby said gaseous products of combustion are cooled in said tertiary heat exchanger to about 120° F. for condensation of at least a portion of condensible gases for substantial recovery of latent heat of condensation of said condensible products of combustion and transfer of said heat to the discharging air.

25. A furnace as claimed in claim 24, in which a perforated deflector plate is disposed in one of said manifolds transverse to the finned tubes whereby gas passing through said manifolds is equally distributed among the finned tubes.

26. A furnace including primary, secondary and tertiary heat exchangers comprising a pair of spaced apart opposed manifolds, a plurality of parallel, equispaced finned tubes interconnecting said manifolds, and drainage means for draining condensate from said tertiary heat exchanger, said tertiary heat exchanger arranged in the exterior housing whereby air to be heated passes said tertiary heat exchanger before contact with the secondary heat exchanger whereby said gaseous products of combustion are cooled in said tertiary heat exchanger to about 120° F. for condensation of at least a portion of condensible gases for substantial recovery of latent heat of condensation of said condensible products of combustion and transfer of said heat to the discharging air, a manifold, an inlet conduit for communicating said manifold to the secondary heat exchanger, an exhaust conduit for discharge of combustion products from said manifold, drainage means for discharge of condensate from said manifold, and a plurality of parallel, equispaced, upstanding thermosiphons, each having a lower evaporator section and an upper condenser section and a low-boiling liquid therein mounted in said manifold whereby the lower evaporator sections of the thermosiphons are seated in the manifold for exposure of hot combustion gases thereto for vaporization of the liquid in the thermosiphons and the upper condenser sections of the thermosiphons are exposed to air to be heated for transfer of heat to said air by condensation of vaporized liquid in the thermosiphons.

27. A furnace as claimed in claim 26, in which said inlet conduit is located at one end of the manifold and the exhaust conduit is located at the opposite end of the manifold, and the upstanding thermosiphons are linearly seated in the manifold.

28. A furnace as claimed in claim 27, in which the ratio of length of evaporator section to condenser sections is about 1:3.5.

29. A furnace as claimed in claim 28, in which said manifold has a plurality of wells seated transversely within the manifold, each of said wells comprising a tube of a corrosion resistant material having a plurality of fins formed on the exterior thereof, and each of said thermosiphons has a tubular extension adapted to seat in a well in tight-fitting engagement.

30. A furnace as claimed in claim 29, in which each of said wells comprises a copper tube having copper fins formed integral therewith coated with teflon, said fins having a diameter substantially equal to the width of the manifold.

31. A furnace as claimed in claim 24, 26 or 29, in which the combustion chamber is an upstanding cylindrical drum and said secondary heat exchanger comprises a closed annular drum concentric with and spaced from the combustion chamber.

* * * * *